United States Patent
Oba

(10) Patent No.: US 11,724,332 B2
(45) Date of Patent: Aug. 15, 2023

(54) EVALUATION SYSTEM AND EVALUATION METHOD

(71) Applicant: OMRON Corporation, Kyoto (JP)

(72) Inventor: Hitoshi Oba, Kameoka (JP)

(73) Assignee: OMRON Corporation, Kyoto (JP)

( * ) Notice: Subject to any disclaimer, the term of this patent is extended or adjusted under 35 U.S.C. 154(b) by 580 days.

(21) Appl. No.: 16/645,804

(22) PCT Filed: Mar. 11, 2019

(86) PCT No.: PCT/JP2019/009736
§ 371 (c)(1),
(2) Date: Mar. 10, 2020

(87) PCT Pub. No.: WO2019/176863
PCT Pub. Date: Sep. 19, 2019

(65) Prior Publication Data
US 2020/0269343 A1 Aug. 27, 2020

(30) Foreign Application Priority Data

Mar. 15, 2018 (JP) ................................. 2018-048473

(51) Int. Cl.
*B23K 11/25* (2006.01)
*B23K 11/24* (2006.01)

(52) U.S. Cl.
CPC .......... *B23K 11/251* (2013.01); *B23K 11/241* (2013.01); *B23K 11/252* (2013.01)

(58) Field of Classification Search
CPC ... B23K 11/251; B23K 11/241; B23K 11/252; B23K 11/258
See application file for complete search history.

(56) References Cited

U.S. PATENT DOCUMENTS

| | | |
|---|---|---|
| 4,945,201 A | 7/1990 | Ito et al. |
| 5,814,783 A | 9/1998 | Harville et al. |
| 2012/0048834 A1 | 3/2012 | Ennsbrunner et al. |

FOREIGN PATENT DOCUMENTS

| | | |
|---|---|---|
| CN | 1176614 A | 3/1998 |
| CN | 1766587 A | 5/2006 |

(Continued)

OTHER PUBLICATIONS

Machine Translation of Zou, CN105345247, performed on Jun. 21, 2022 (Year: 2016).*

(Continued)

*Primary Examiner* — Brian W Jennison
(74) *Attorney, Agent, or Firm* — Metrolex IP Law Group, PLLC.

(57) ABSTRACT

Provided is an evaluation system including: an analog-to-digital converting section comprised of a programmable circuit and configured to convert an analog signal, the analog signal being acquired by a physical quantity acquiring section and indicative of a time-series change of at least one of (i) welding current, welding voltage, or load applied to pieces to be welded and (ii) a displacement, during welding, of a welding head; and an evaluating section configured to determine, based on a digital signal, whether or not the time-series change satisfies a predetermined condition, wherein configuration data for configuring the programmable circuit is arranged to be changeable by a user.

1 Claim, 11 Drawing Sheets

(56) References Cited

FOREIGN PATENT DOCUMENTS

| | | |
|---|---|---|
| CN | 204504488 U | 7/2015 |
| CN | 105149762 A | 12/2015 |
| CN | 105345247 A | 2/2016 |
| JP | H04-505287 A | 9/1992 |
| JP | H11-338688 A | 12/1999 |
| JP | 2000-301349 A | 10/2000 |
| JP | 2003-311428 A | 11/2003 |
| JP | 2005-258996 A | 9/2005 |
| JP | 2006-122950 A | 5/2006 |
| JP | 2010-269337 A | 12/2010 |
| JP | 2012-076146 A | 4/2012 |
| JP | 2012-526658 A | 11/2012 |
| JP | 2014-119912 A | 6/2014 |
| JP | 6164352 B1 | 7/2017 |
| JP | 2018-31720 A | 3/2018 |

OTHER PUBLICATIONS

Machine Translation of Sun et al. CN 105149762, performed on Jun. 21, 2022 (Year: 2015).*

Updated Machine Translation of Zou, CN105345247 performed on Nov. 30, 2022 (Year: 2016).*

English translation of the International Search Report("ISR") of PCT/JP2019/009736 dated Jun. 4, 2019.

Written Opinion("WO") of PCT/JP2019/009736 dated Jun. 4, 2019.

Office Action (JPOA) dated Feb. 22, 2022 in a counterpart Japanese patent application.

Extended European search report (EESR) dated Nov. 9, 2021 in a counterpart European patent application.

Jiannong Wang et al., "Introduction and Practice of PLD System Design", Jul. 31, 2016, p. 20-21, 1st edition, National Defense Industry Press; Relevance is indicated in the (translated) CNOA issued on Mar. 10, 2022.

Office Action (CNOA) dated Mar. 10, 2022 in a counterpart Chinese patent application.

Yasuda et aL., "High-Density FPGA Circuit Technology Using Pure-CMOS Crossbar Antifuse Memory", 2017, pp. 40-44, vol. 72, No. 2, Relevance is indicated in the (translated) Notification issued on Aug. 30, 2021.

Notification of Information dated Aug. 30, 2021 in a counterpart Japanese patent application.

Office Action dated Nov. 4, 2020 in a counterpart Japanese patent application.

Communication and Navigation Professional Committee of China Navigation Society Proceedings of the 2005 Annual Academic Conference, Dec. 2005, Version 1, Dalian Maritime University Press. Relevance is indicated in the (translated) CNOA issued on Mar. 11, 2021.

Office Action dated Mar. 11, 2021 in a counterpart Chinese patent application.

Notice of Submission of Publications, etc. dated Jan. 5, 2022 in a counterpart Japanese patent application.

\* cited by examiner

EVALUATION SYSTEM AND EVALUATION METHOD

TECHNICAL FIELD

The present invention relate to an evaluation system and an evaluation method.

BACKGROUND ART

Resistance welding is the joining of metals by placing pieces of metal to be joined on top of each other, sandwiching by electrodes the area which is to be joined, applying appropriate pressure and passing electric current, and thereby allowing the pieces of metal to be fusion-bonded to each other using Joule's heat generated from contact resistance at the area to be joined. The welded portions of the metal pieces should be joined together sufficiently firmly; therefore, it is necessary to check the quality of the welded state. Such a check of the welded state can be carried out by destructive testing, typical examples of which are tensile tests, impact tests, and the like. However, all of these tests involve applying irreversible stress to the joined portion, and therefore cannot be used to inspect mass-produced products on a 100 percent basis. Therefore, such methods can only be used to carry out sampling inspection. In order to solve such an issue, there is a system to evaluate, by nondestructive testing, the quality of welding done by a welding apparatus. This system is capable of checking weld strength by: in a resistance welding step, loading an analog signal (such as welding current, welding voltage, displacement of welding head, load, which are important parameters relevant to weld strength) into a PC via a weld checker or via an analog input board; and checking the acquired analog values and waveforms. This system is promising in applications in in-line total inspection in the manufacturing process, and is therefore required, in order to achieve real-time inspection of weld strength, to acquire an instantaneous (about several microseconds to several tens of microseconds) behavior of analog value during welding. In order to meet such a demand, there is proposed a system to evaluate, nondestructively in a short period of time, the quality of welding done by the welding apparatus (see Patent Literature 1).

CITATION LIST

Patent Literature

Patent Literature 1

Japanese Patent Application Publication, Tokukai, No. 2012-76146

SUMMARY OF INVENTION

Technical Problem

As described earlier, such a system, by which the weld quality is evaluated nondestructively in a short period of time, is required to have rapidity (sampling rate of ten to several tens of microseconds per sampling) in order to acquire an instantaneous (about several microseconds to several tens of microseconds) behavior of analog value during welding. Such a system, by which the weld quality is evaluated nondestructively in a short period of time, needs to include evaluation apparatuses which are specially configured for their corresponding measurement apparatuses. This necessitates a lot of effort and cost in constructing an evaluation system.

The present invention was made in view of the above issue, and an object thereof is to provide an evaluation system that is capable of evaluating weld quality nondestructively in a shorter period of time and that can be constructed with less effort.

Solution to Problem

An aspect of the present invention is directed to an evaluation system including: an analog-to-digital converting section configured to convert an analog signal to a digital signal, the analog signal being acquired by a physical quantity acquiring section and indicative of a time-series change of at least one of (i) welding current, welding voltage, or load applied to pieces to be welded during welding and (ii) a displacement, during welding, of a welding head of a welding apparatus that is configured to apply the welding current, welding voltage, or load to the pieces to be welded; and an evaluating section configured to acquire the digital signal and determine, based on the digital signal, whether or not at least one of (i) the welding current, welding voltage or load applied during welding and (ii) the displacement satisfies a predetermined condition, wherein the analog-to-digital converting section is comprised of a programmable circuit, and configuration data for configuring the programmable circuit is arranged to be changeable by a user.

Another aspect of the present invention is directed to an evaluation method including: an analog-to-digital converting step including converting an analog signal to a digital signal, the analog signal being acquired by a physical quantity acquiring section and indicative of a time-series change of at least one of (i) welding current, welding voltage, or load applied to pieces to be welded during welding and (ii) a displacement, during welding, of a welding head of a welding apparatus that is configured to apply the welding current, welding voltage, or load to the pieces to be welded; and an evaluating step including acquiring the digital signal and determining, based on the digital signal, whether or not at least one of (i) the welding current, welding voltage or load applied during welding and (ii) the displacement satisfies a predetermined condition, wherein the analog-to-digital converting step is achieved by a programmable circuit, and configuration data for configuring the programmable circuit is arranged to be changeable by a user.

Advantageous Effects of Invention

The present invention makes it possible for a user to construct, with less effort, an evaluation system that is capable of evaluating weld quality nondestructively in a shorter period of time.

DESCRIPTION OF EMBODIMENTS

Embodiment 1

Figure 1:
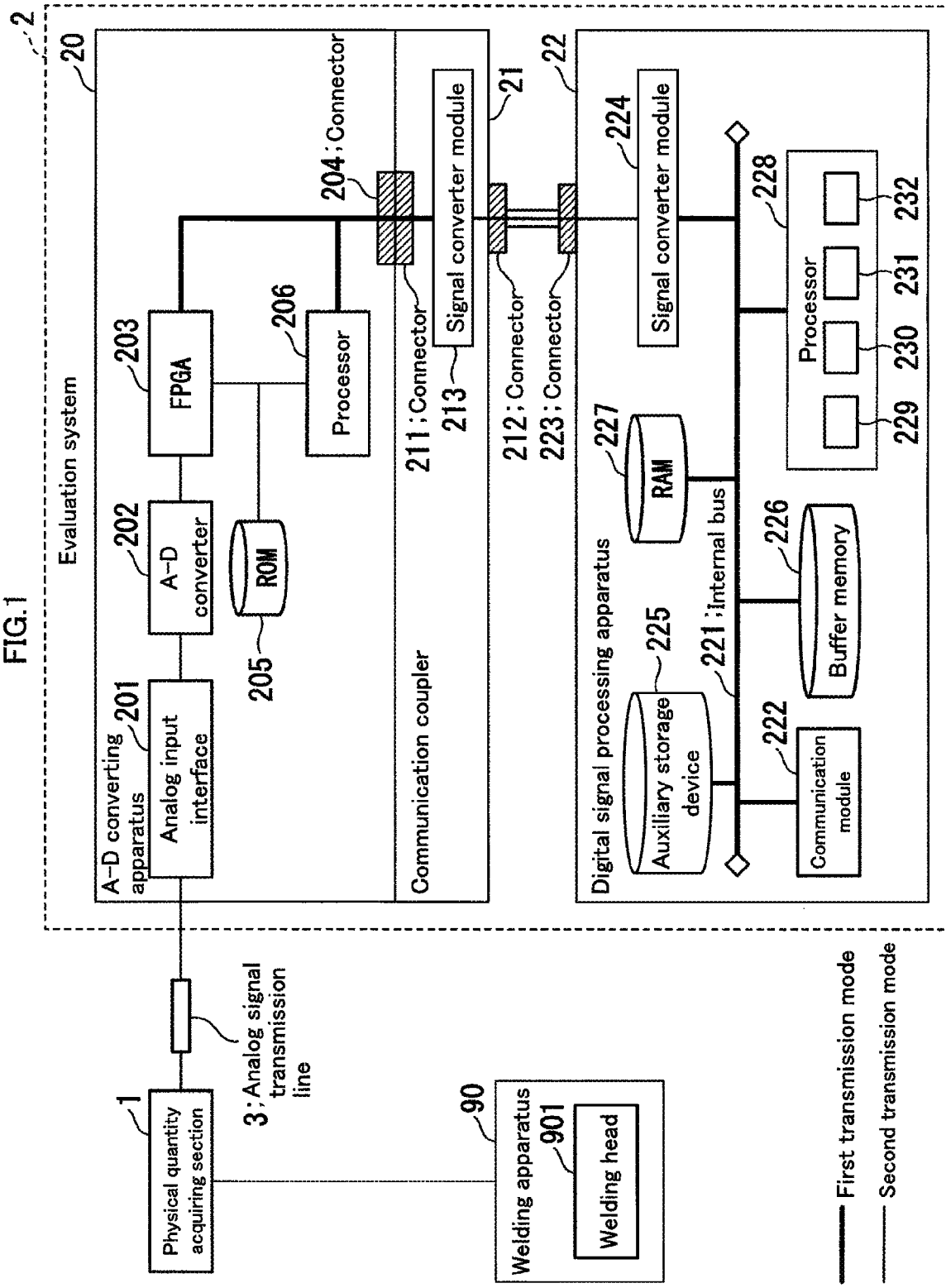
FIG. 1 illustrates a specific example of a configuration of an evaluation system 2 in accordance with Embodiment 1.

FIG. 1 illustrates a specific example of a configuration of an evaluation system 2 in accordance with Embodiment 1. The evaluation system 2 is a system to achieve real-time processing by evaluating, in a short period of time, the quality of welding done by a welding apparatus 90. The welding apparatus 90 includes a welding head 901. The welding head 901 holds members that are movable in one or more predetermined directions in a three-dimensional space and that apply welding current, welding voltage, or load to pieces to be welded. The welding apparatus 90 applies, with use of the members held by the welding head 901, welding current, welding voltage or load to the pieces to be welded. The evaluation system 2 is connected to a physical quantity acquiring section 1 via an analog signal transmission line 3. The physical quantity acquiring section 1 (a specific example of measurement apparatus) nondestructively acquires a time-series analog signal indicative of the manner in which the welding apparatus 90 operates during welding. The time-series analog signal indicative of the manner in which the welding apparatus 90 operates during welding is a signal indicative of analog values, at respective times during welding, each representing physical quantity that can be acquired nondestructively by the physical quantity acquiring section 1 and that is indicative of how the welding apparatus 90 operates during welding. The physical quantity that can be acquired nondestructively and that is indicative of how the welding apparatus 90 operates during welding is, specifically, the magnitude of welding current, welding voltage, or load applied by the welding apparatus 90 to the pieces to be welded, displacement of the welding head 901 during welding (hereinafter referred to as "welding head displacement"), or the like. The physical quantity acquiring section 1 may be, for example, a weld checker.

The analog signal transmission line 3 transmits the analog signal, which is acquired by the physical quantity acquiring section 1, to the evaluation system 2. Note that the quality of welding (or weld quantity) means to what degree the welding done by the welding apparatus 90 with respect to pieces satisfies desired conditions concerning welding. The weld quantity is, for example, weld strength. Note that "real-time processing" means a process of, immediately after completion of welding by the welding apparatus 90, evaluating the quality of welding done by the welding apparatus 90. Note that the phrase "immediately after" means that evaluation of weld quantity and update of welding controlling value based on the evaluation can be done within a period from when the welding by the welding apparatus 90 is completed to when welding of another set of pieces is started. The welding controlling value is a value that controls (i) welding current, welding voltage, or load applied to the pieces to be welded when the welding apparatus 90 carries out welding and (ii) welding head displacement. The welding controlling value is, specifically, a value indicative of the magnitude of welding current, welding voltage, or load applied by the welding apparatus 90 to the pieces to be welded, welding head displacement, a point in time at which welding current, welding voltage, or load is to be applied, or the like.

The evaluation system 2 includes an analog-to-digital (A-D) converting apparatus 20, a communication coupler 21, and a digital signal processing apparatus 22.

The A-D converting apparatus 20 acquires the analog signal acquired by the physical quantity acquiring section 1, and converts the thus-acquired analog signal into a digital signal. The A-D converting apparatus 20 is, for example, a high-speed analog input unit. The A-D converting apparatus 20 samples an analog signal at sampling intervals of several microseconds to several tens of microseconds and quantizes the sampled analog signal, thereby converting the analog signal to a digital signal. The A-D converting apparatus 20 transmits, within itself, the digital signal in a predetermined transmission mode for transmission of digital signals (hereinafter referred to as "first transmission mode"). The A-D converting apparatus 20 is comprised of a circuit that is programmable by a user. The circuit programmable by a user is, for example, field programmable gate array (FPGA). Note that the A-D converting apparatus 20 is a specific example of an analog-to-digital converting section.

The communication coupler 21 includes a communication module, and communicates with the digital signal processing apparatus 22 via a cable that is connected to the communication coupler 21 and that transmits digital signals (this cable is hereinafter referred to as "digital signal transmission line"). The communication coupler 21 includes a connector 211, a connector 212, and a signal converter module 213. The connector 211 electrically connects the A-D converting apparatus 20 and the communication coupler 21. The connector 212 electrically connects the communication coupler 21 and the digital signal transmission line. The connector 212 may be, for example, RJ-45.

The digital signal transmission line transmits the digital signal in a transmission mode for transmission of digital signals between distant apparatuses (this mode is hereinafter referred to as "second transmission mode"). The digital signal transmission line is, for example, an EtherCAT (registered trademark) cable, an EtherNet I/P (registered trademark) cable, or the like. The digital signal transmission line may transmit digital signals by, for example, serial communication.

The signal converter module 213 converts the digital signal, transmitted in the first transmission mode, into a digital signal for transmission in the second transmission mode.

The digital signal processing apparatus 22 is comprised of an information processor. The digital signal processing apparatus 22 is, for example, a programmable logic controller (PLC). The digital signal processing apparatus 22 is connected to the A-D converting apparatus 20 via the communication coupler 21, and inputs thereto a time-series digital signal that is sequentially outputted from the A-D converting apparatus 20. The digital signal processing apparatus 22 acquires the digital signal converted by the A-D converting apparatus 20 and, based on the thus-acquired digital signal, evaluates the quality of welding done by the welding apparatus 90. The transmission mode in which the digital signal is transmitted within the digital signal processing apparatus 22 is the first transmission mode.

The following description will discuss configurations of the A-D converting apparatus 20 and the digital signal processing apparatus 22 in detail.

First, a hardware structure of the A-D converting apparatus 20 is discussed. The A-D converting apparatus 20 includes an analog input interface 201, an A-D converter 202, a field programmable gate array (FPGA) 203, a connector 204, a read only memory (ROM) 205, and a processor 206.

The analog input interface 201 is an input interface for analog signals. The analog input interface 201 connects the physical quantity acquiring section 1 and the A-D converting apparatus 20, and inputs, into the A-D converting apparatus 20, the analog signal outputted from the physical quantity acquiring section 1.

The A-D converter 202 converts the analog signal, inputted via the analog input interface 201, into a digital signal. Specifically, the A-D converter 202 samples the analog signal at sampling intervals of several microseconds to several tens of microseconds and quantizes the sampled analog signal with a predetermined quantization level, thereby converting the analog signal into a digital signal.

The FPGA 203 is a circuit that carries out arithmetic processing on the digital signal converted by the A-D converter 202 and that is programmable by a user. Specific examples of the arithmetic processing include digital filtering, offset/span setting, and the like. Specific examples of digital filtering include smoothing using a lowpass filter, moving average, or the like. The digital signal is transmitted from the FPGA 203 to the signal converter module 213 of the communication coupler 21 in the first transmission mode. The digital signal, after subjected to arithmetic processing, is transmitted to the digital signal processing apparatus 22 via the communication coupler 21.

Specifically, the A-D converting apparatus 20 pre-stores, in the ROM 205, configuration data for configuring the FPGA 203 as a circuit that carries out arithmetic processing. The FPGA 203 acquires, from the processor 206, configuration data read from the ROM 205 at the time of start-up of the A-D converting apparatus 20, carries out a process of configuring a logic circuit based on the thus-acquired configuration data (this process is generally called "configuration"), and thereby configures itself as a circuit that carries out arithmetic processing. This enables a user to change the configuration of the circuit of the A-D converting apparatus 20 by changing the configuration data stored in the ROM 205. The expression "programmable by a user" hereinafter means that one or more values of configuration data can be changed by a user.

The connector 204, when connected to the connector 211, electrically connects the A-D converting apparatus 20 and the communication coupler 21. Specifically, the processor 206 and the communication coupler 21 are electrically connected together by the connector 204. Also, the FPGA 203 and the communication coupler 21 are electrically connected together by the connector 204. The FPGA 203 is connected to the communication coupler 21, and thereby the time-series digital signal, after subjected to arithmetic processing by the FPGA 203, is transmitted to the digital signal processing apparatus 22 via the communication coupler 21.

The ROM 205 stores various kinds of setting information for use in operation of the A-D converting apparatus 20, configuration data, various kinds of information acquired or generated by the A-D converting apparatus 20, and the like. The ROM 205 does not need to be a read-only memory, and may be a readable and writable memory (e.g., flash ROM).

Next, a hardware structure of the digital signal processing apparatus 22 is discussed. The digital signal processing apparatus 22 includes a communication module 222, a connector 223, a signal converter module 224, an auxiliary storage device 225, a buffer memory 226, a random access memory (RAM) 227, and a processor 228, which are connected together by an internal bus 221.

The communication module 222 is a communication interface for communication between the digital signal processing apparatus 22 and an external apparatus that outputs configuration data. The communication module 222 is connected to a communication interface of the external apparatus, and acquires the configuration data outputted from the external apparatus. The configuration data acquired by the communication module 222 is stored in the auxiliary storage device 225. Note that the external apparatus is, for example, a personal computer. A user is enabled to input, via the external apparatus, configuration data corresponding to the physical quantity acquiring section 1 into the evaluation system 2.

The connector 223 electrically connects the digital signal transmission line and the internal bus 221. The digital signal transmission line and the internal bus 221 are electrically connected together, and thereby the A-D converting apparatus 20 is electrically connected to the communication module 222, the auxiliary storage device 225, the buffer memory 226, the RAM 227, and the processor 228 via the internal bus 221. The connector 223 may be, for example, RJ-45.

The signal converter module 224 converts the digital signal, transmitted in the second transmission mode, into a digital signal for transmission in the first transmission mode. The digital signal, converted by the signal converter module 224 to the first transmission mode, is transmitted to the buffer memory 226 via the internal bus 221.

The auxiliary storage device 225 is comprised of a storage device such as magnetic hard disk drive, semiconductor storage device, or the like. The auxiliary storage device 225 stores configuration data for configuring FPGA 203, various kinds of setting information for use in operation of the digital signal processing apparatus 22, various kinds of information acquired and generated by the digital signal processing apparatus 22, and the like.

The buffer memory 226 stores a value of the digital signal acquired from the A-D converting apparatus 20 via the communication coupler 21. The buffer memory 226 carries out storing and deletion of the value of the digital signal repeatedly at a predetermined operation cycle. The processor 228 accesses the buffer memory 226 in synchronization with the operation cycle, and is thereby capable of reading the value of the digital signal from the buffer memory 226 and storing it in the RAM 227.

The RAM 227 and the processor 228 carry out processes to realize operation of the digital signal processing apparatus 22. Specifically, the processor 228 loads a computer program from the auxiliary storage device 225 into the RAM 227 and executes the program. By the execution of the computer program, the digital signal processing apparatus 22 functions as an apparatus that includes a first storing section 229, an evaluating section 230, a second storing section 231, and a data transmission controlling section 232. The digital signal processing apparatus 22 causes the functional sections to operate by the computer program, and carries out processes such as storing the value of the digital signal, comparing values of the digital signal, and the like. The program executed by the RAM 227 and the processor 228 is hereinafter referred to as "digital signal processing operation program".

Figure 2:
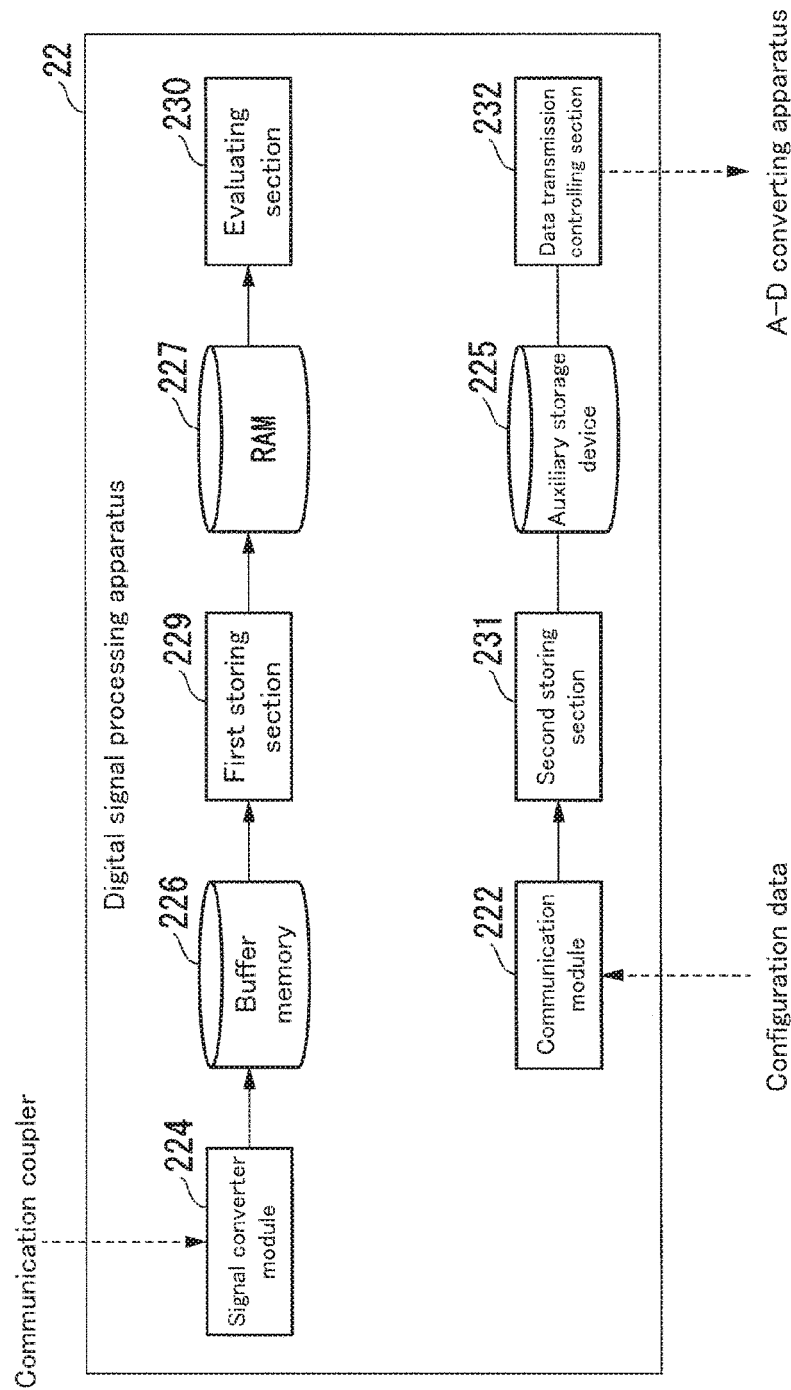
FIG. 2 is a block diagram illustrating a specific example of a functional configuration of a digital signal processing apparatus 22 in accordance with Embodiment 1.

FIG. 2 is a block diagram illustrating a specific example of a functional configuration of the digital signal processing apparatus 22 in accordance with Embodiment 1. The first storing section 229 acquires the value of the digital signal stored in the buffer memory 226, and causes the value of the thus-acquired time-series digital signal to be stored in the RAM 227.

The evaluating section 230 evaluates the quality of welding done by the welding apparatus 90 by a predetermined method, based on the waveform of the time-series digital signal stored in the RAM 227. A time-series digital signal that is for use by the evaluating section 230 in evaluation of the weld quality and that is stored in the RAM 227 is hereinafter referred to as "evaluation signal". The predetermined method, by which the evaluating section 230 evaluates the weld quality, may be any method, provided that the method makes it possible to evaluate the weld quality within a period of time short enough to achieve real-time processing. The predetermined method may be, for example, a method of evaluating the weld quality within a period of time short enough to achieve real-time processing, by determining whether or not the value of welding current indicated by the evaluation signal at each time falls within a range predetermined for that time. The predetermined method may be, for example, a method of evaluating the weld quality within a period of time short enough to achieve real-time processing, by determining whether or not the value of welding voltage indicated by the evaluation signal at each time falls within a range predetermined for that time. The predetermined method may be, for example, a method of evaluating the weld quality within a period of time short enough to achieve real-time processing, by determining whether or not the value of load indicated by the evaluation signal at each time falls within a range predetermined for that time. The predetermined method may be, for example, a method of evaluating the weld quality within a period of time short enough to achieve real-time processing, by determining whether or not the welding head displacement indicated by the evaluation signal at each time falls within a range predetermined for that time. The result of evaluation of the weld quality by the evaluating section 230 may be stored in the RAM 227 by the first storing section 229.

The following description is, for simplicity, based on the assumption that the evaluation signal is a time-series digital signal indicative of the value of welding current applied by the welding apparatus 90 to pieces to be welded.

The second storing section 231 causes configuration data acquired by the communication module 222 to be stored in the auxiliary storage device 225.

The data transmission controlling section 232 acquires the configuration data stored in the auxiliary storage device 225, at a predetermined point in time. The data transmission controlling section 232 transmits the thus-acquired configuration data to the A-D converting apparatus 20 via the communication coupler 21.

The predetermined point in time may be, for example, a point in time at which the digital signal processing apparatus 22 is powered on or a point in time at which configuration data is stored in the auxiliary storage device 225.

FIGS. 3 to 7 show specific examples of welding current applied by the welding apparatus 90 in accordance with Embodiment 1 to pieces to be welded. The value of welding current applied by the welding apparatus 90 to the pieces to be welded is acquired by the physical quantity acquiring section 1 and inputted into the A-D converting apparatus 20; therefore, FIGS. 3 to 7 can be regarded as also showing specific examples of an analog signal inputted to the A-D converting apparatus 20.

Figure 3:
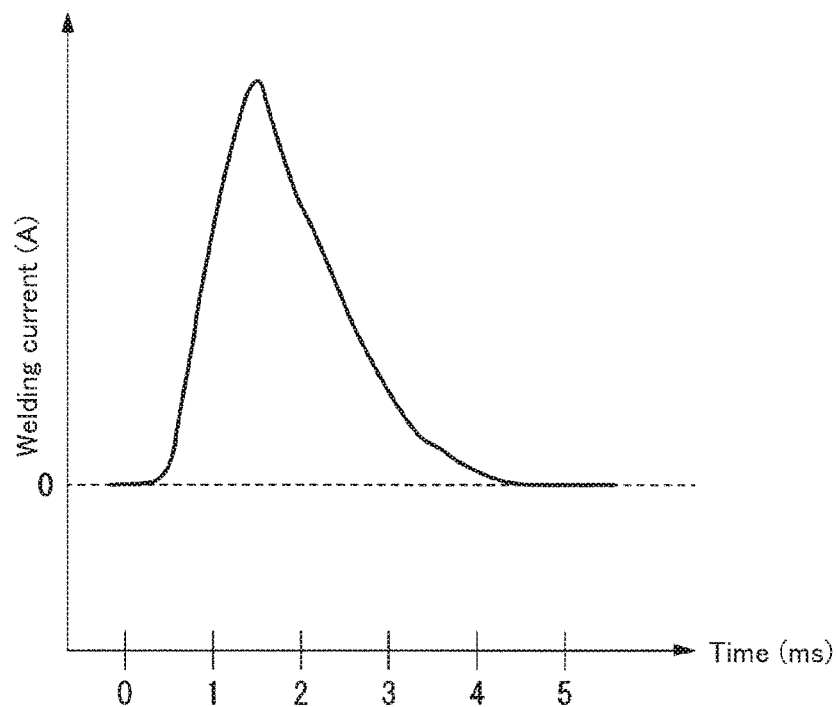
FIG. 3 is a chart showing a first specific example of welding current applied by a welding apparatus 90 in accordance with Embodiment 1 to pieces to be welded.

FIG. 3 is a chart showing a first specific example of welding current applied by the welding apparatus 90 in accordance with Embodiment 1 to pieces to be welded. The horizontal axis in FIG. 3 indicates time, and the vertical axis in FIG. 3 indicates the value of welding current applied by the welding apparatus 90 to the pieces to be welded. In FIG. 3, the welding current is a single pulse having a pulse width that is substantially equal to 2 milliseconds. In FIG. 3, the period of time during which the welding apparatus 90 applies the welding current is substantially equal to 5 milliseconds.

Figure 4:
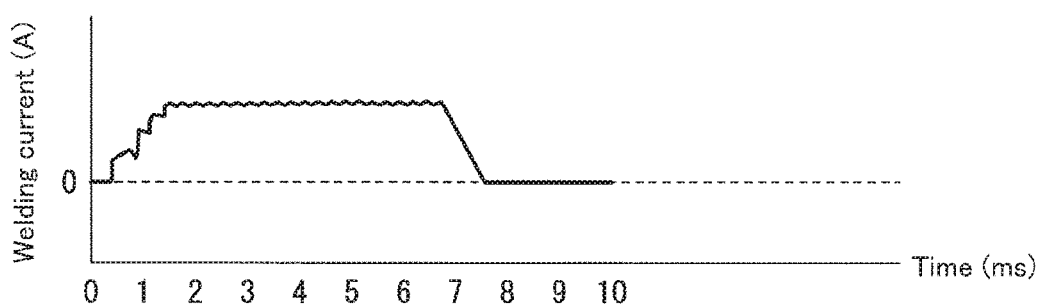
FIG. 4 is a chart showing a second specific example of welding current applied by the welding apparatus 90 in accordance with Embodiment 1 to pieces to be welded

FIG. 4 is a chart showing a second specific example of welding current applied by the welding apparatus 90 in accordance with Embodiment 1 to pieces to be welded. The horizontal axis in FIG. 4 indicates time, and the vertical axis in FIG. 4 indicates the value of welding current applied by the welding apparatus 90 to the pieces to be welded. In FIG. 4, the welding current is a single rectangular pulse having a pulse width that is substantially equal to 5 milliseconds. In FIG. 4, the period of time during which the welding apparatus 90 applies the welding current is substantially equal to 8 milliseconds.

Figure 5:
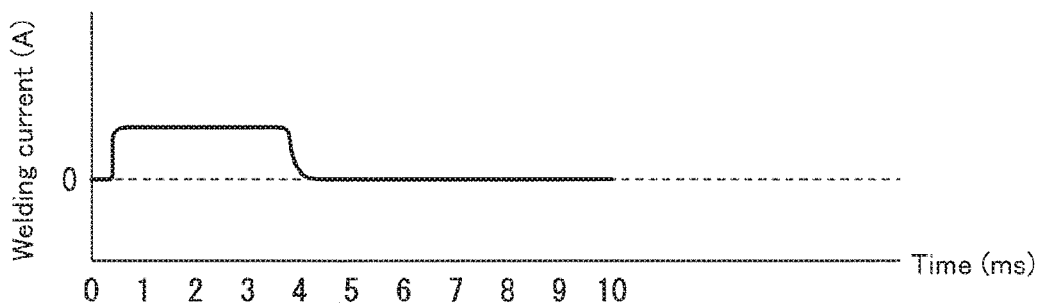
FIG. 5 is a chart showing a third specific example of welding current applied by the welding apparatus 90 in accordance with Embodiment 1 to pieces to be welded.

FIG. 5 is a chart showing a third specific example of welding current applied by the welding apparatus 90 in accordance with Embodiment 1 to pieces to be welded. The horizontal axis in FIG. 5 indicates time, and the vertical axis in FIG. 5 indicates the value of welding current applied by the welding apparatus 90 to the pieces to be welded. In FIG. 5, the welding current is a single pulse having a pulse width that is substantially equal to 3 milliseconds. In FIG. 5, the period of time during which the welding apparatus 90 applies the welding current is substantially equal to 4 milliseconds.

Figure 6:
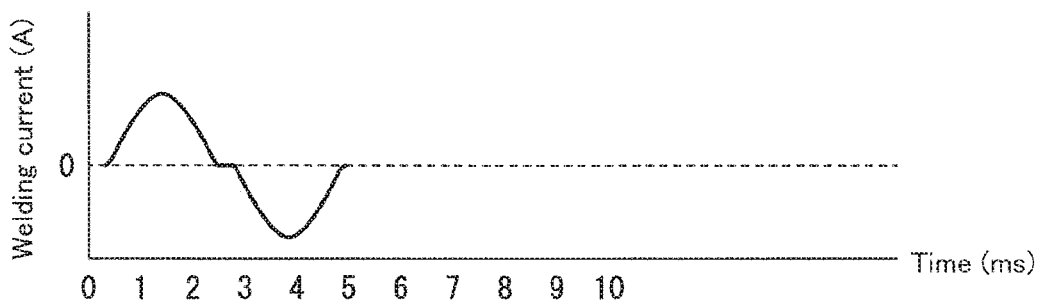
FIG. 6 is a chart showing a fourth specific example of welding current applied by the welding apparatus 90 in accordance with Embodiment 1 to pieces to be welded.

FIG. 6 is a chart showing a fourth specific example of welding current applied by the welding apparatus 90 in accordance with Embodiment 1 to pieces to be welded. The horizontal axis in FIG. 6 indicates time, and the vertical axis in FIG. 6 indicates the value of welding current applied by the welding apparatus 90 to the pieces to be welded. In FIG.

6, the welding current is electric current that takes positive and negative values. In FIG. 6, the welding current is electric current that switches between positive and negative values at intervals substantially equal to 2 milliseconds. In FIG. 6, the period of time during which the welding apparatus 90 applies the welding current is substantially equal to 5 milliseconds.

Figure 7:
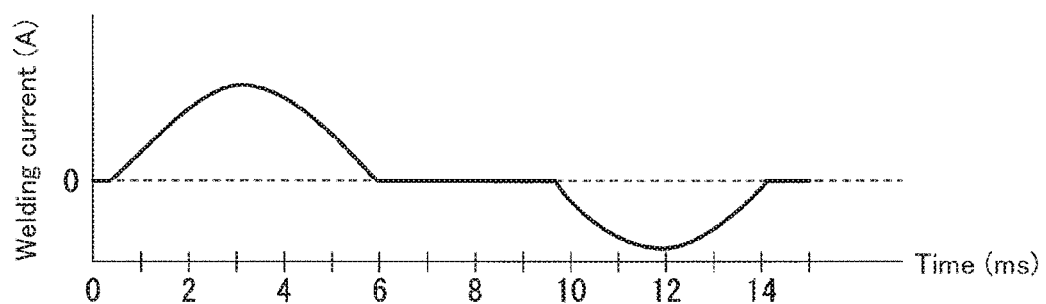
FIG. 7 is a chart showing a fifth specific example of welding current applied by the welding apparatus 90 in accordance with Embodiment 1 to pieces to be welded.

FIG. 7 is a chart showing a fifth specific example of welding current applied by the welding apparatus 90 in accordance with Embodiment 1 to pieces to be welded. The horizontal axis in FIG. 7 indicates time, and the vertical axis in FIG. 7 indicates the value of welding current applied by the welding apparatus 90 to the pieces to be welded. In FIG. 7, the welding current is electric current that takes positive and negative values. In FIG. 7, the welding current is electric current that switches between positive and negative values at intervals substantially equal to 4 milliseconds. In FIG. 7, the period of time during which the welding apparatus 90 applies the welding current is substantially equal to 14 milliseconds.

As shown in FIGS. 3 to 7, the period of time during which the welding apparatus 90 applies welding current to pieces to be welded is several milliseconds to 14 milliseconds. Furthermore, as shown in FIGS. 3 to 7, the welding current applied by the welding apparatus 90 is electric current that changes at intervals of several milliseconds.

Figure 8:
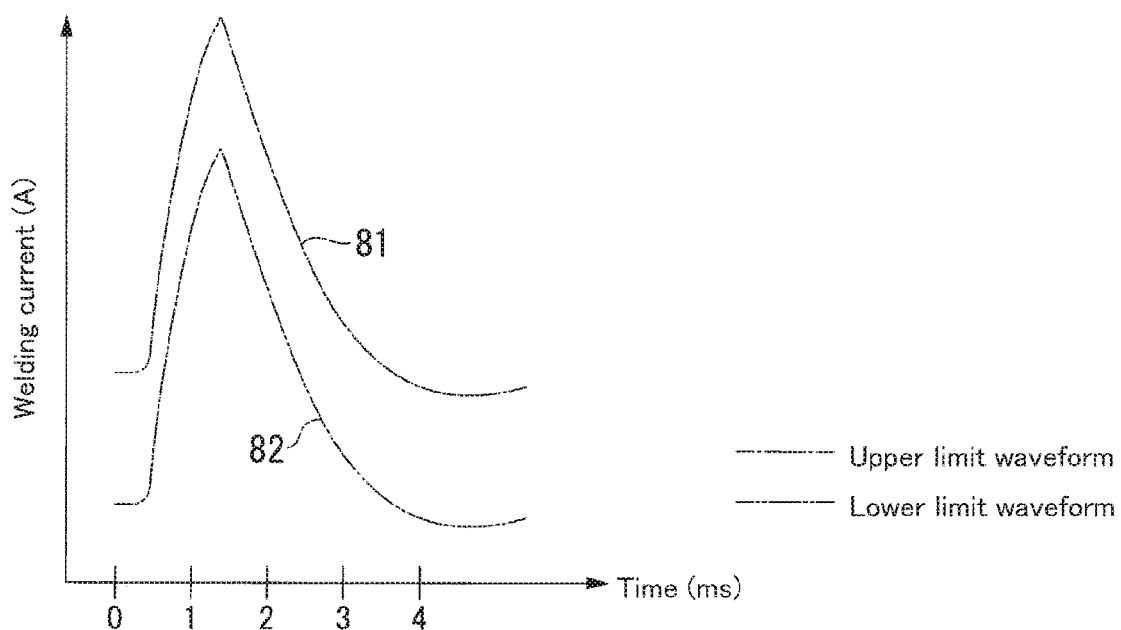
FIG. 8 is an illustrative chart of a method by which an evaluating section 230 in accordance with Embodiment 1 evaluates weld quality.
Figure 9:
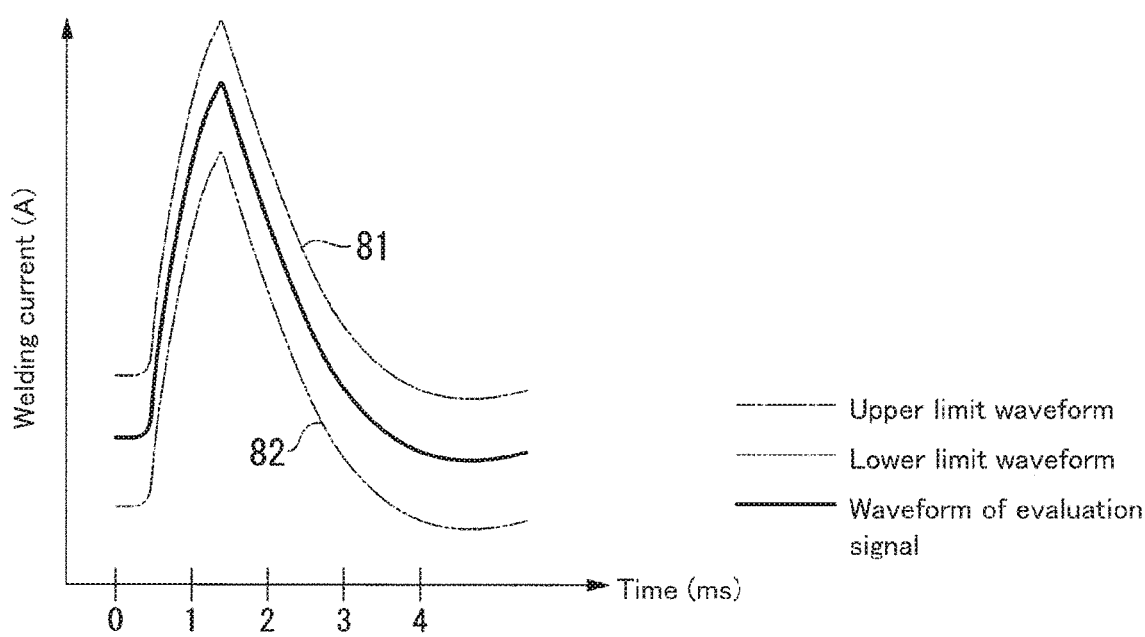
FIG. 9 is a chart showing a specific example of a relationship among a waveform of an evaluation signal, an upper limit waveform 81, and a lower limit waveform 82, obtained in a case where the quality of welding done by the welding apparatus 90 in accordance with Embodiment 1 is good.
Figure 10:
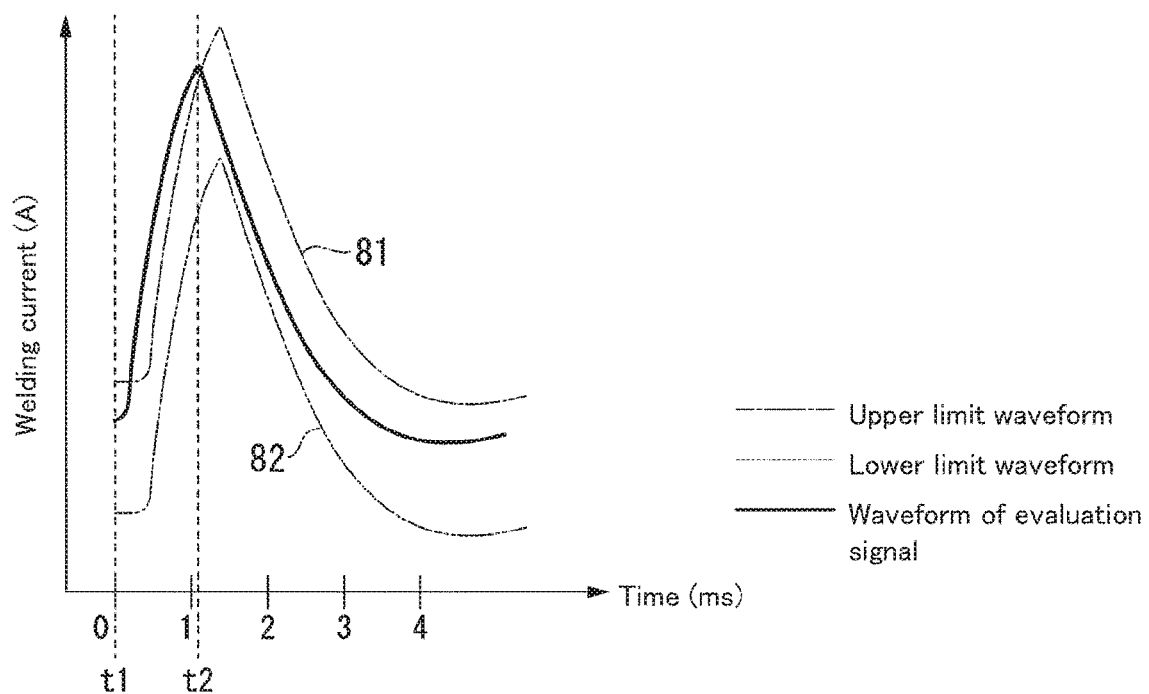
FIG. 10 is a chart showing a specific example of a relationship among a waveform of the evaluation signal, the upper limit waveform 81, and the lower limit waveform 82, obtained in a case where the quality of welding done by the welding apparatus 90 in accordance with Embodiment 1 is not good.

The following description discusses, with reference to FIGS. 8 to 10, a specific example of a method of evaluating weld quality within a period of time short enough for the evaluating section 230 in accordance with Embodiment 1 to achieve real-time processing, i.e., a method of evaluating weld quality by determining whether or not the value of welding current indicated by the evaluation signal at each time falls within a range predetermined for that time.

FIG. 8 is an illustrative chart of a method by which the evaluating section 230 in accordance with Embodiment 1 evaluates weld quality.

In FIG. 8, an upper limit waveform 81 and a lower limit waveform 82 are waveforms which serve as references when the evaluating section 230 evaluates weld quality based on the evaluation signal. The evaluating section 230 determines that the quality of welding done by the welding apparatus 90 is good, in cases where the values of welding current indicated by the evaluation signal at respective times are equal to or less than the current values indicated by the upper limit waveform 81 and equal to or more than the current values indicated by the lower limit waveform 82.

FIG. 9 is a chart showing a specific example of a relationship among a waveform of the evaluation signal, the upper limit waveform 81, and the lower limit waveform 82, obtained in a case where the quality of welding done by the welding apparatus 90 in accordance with Embodiment 1 is good.

In FIG. 9, the value of welding current indicated by the evaluation signal, at each time, is equal to or less than the current value indicated by the upper limit waveform 81 and equal to or more than the current value indicated by the lower limit waveform 82. Therefore, in the case as shown in FIG. 9, the evaluating section 230 determines that the quality of welding done by the welding apparatus 90 is good.

FIG. 10 is a chart showing a specific example of a relationship among a waveform of the evaluation signal, the upper limit waveform 81, and the lower limit waveform 82, obtained in a case where the quality of welding done by the welding apparatus 90 in accordance with Embodiment 1 is not good.

In FIG. 10, the values of welding current indicated by the evaluation signal, between time t1 and time t2, are each equal to or greater than the current value indicated by the upper limit waveform 81 and not equal to or less than the current value indicated by the upper limit waveform 81. Therefore, in the case as shown in FIG. 10, the evaluating section 230 determines that the quality of welding done by the welding apparatus 90 is not good.

Note that the evaluating section 230 does not need to be arranged such that the evaluating section 230 determines that the weld quality is good when the values of welding current indicated by the evaluation signal at respective times are equal to or less than the current values indicated by the upper limit waveform 81 and equal to or more than the current values indicated by the lower limit waveform 82 and determines that the weld quality is not good otherwise. Alternatively, the following arrangement may be employed: the evaluating section 230 determines that the weld quality is not good when the values of welding current indicated by the evaluation signal at respective times are equal to or less than the current values indicated by the upper limit waveform 81 and equal to or greater than the current values indicated by the lower limit waveform 82 and determines that the weld quality is good otherwise.

Figure 11:
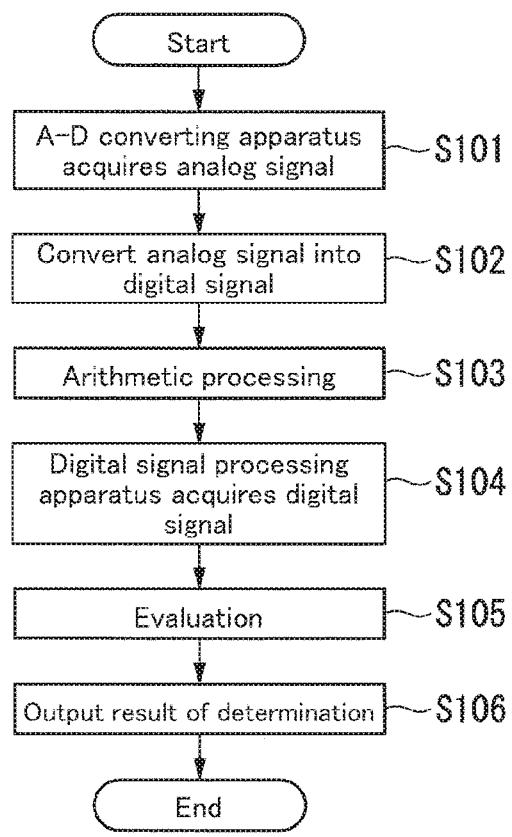
FIG. 11 is a flowchart showing a flow of a specific process by which the evaluation system 2 in accordance with Embodiment 1 evaluates weld quality.

FIG. 11 is a flowchart showing a flow of a specific process by which the evaluation system 2 in accordance with Embodiment 1 evaluates weld quality.

The A-D converting apparatus 20 acquires, via the analog input interface 201, a time-series analog signal indicative of values, at respective times during welding, of at least one of the following physical quantities: the magnitude of welding current, welding voltage or load applied by the welding apparatus 90 to pieces to be welded and acquired by the physical quantity acquiring section 1; and welding head displacement acquired by the physical quantity acquiring section 1 (step S101). The A-D converter 202 converts the time-series analog signal acquired in step S101 into a time-series digital signal (step S102). The FPGA 203, which is configured based on configuration data stored in ROM 205, carries out predetermined arithmetic processing on the time-series digital signal obtained in step S102 (step S103). The digital signal processing apparatus 22 acquires, via the communication coupler 21, the time-series digital signal subjected to the arithmetic processing in step S103 (step S104). Specifically, the buffer memory 226 stores therein values of the time-series digital signal transmitted from the A-D converting apparatus 20 via the communication coupler 21. The evaluating section 230 evaluates the quality of welding done by the welding apparatus 90, based on the time-series digital signal obtained in step S104 (step S105). The first storing section 229 stores the result of the evaluation in the RAM 227 (step S106).

Figure 12:
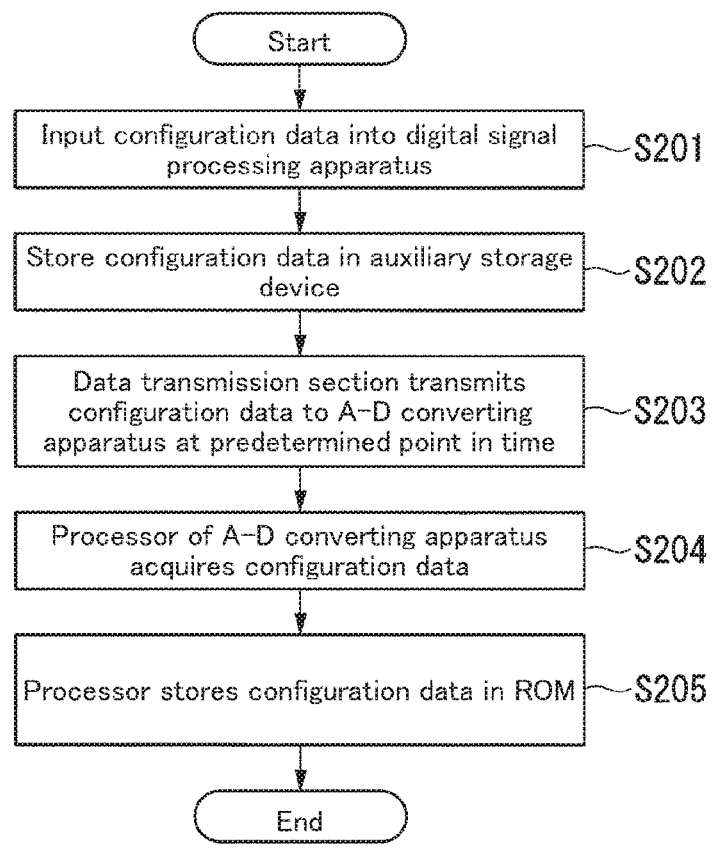
FIG. 12 is a flowchart showing a flow of a specific process by which configuration data for configuring an FPGA 203 in accordance with Embodiment 1 is stored in a ROM 205.

FIG. 12 is a flowchart showing a flow of a specific process by which configuration data for configuring the FPGA 203 in accordance with Embodiment 1 is stored in the ROM 205.

A user inputs configuration data, for configuring the FPGA 203, to the communication module 222 via an external apparatus that is capable of communication with the communication module 222 (step S201). The configuration data acquired by the communication module 222 is stored in the auxiliary storage device 225 by the second storing section 231 (step S202). The data transmission controlling section 232 transmits, to the A-D converting apparatus 20 at a predetermined point in time, the configuration data stored in the auxiliary storage device 225 (step S203). Specifically, the data transmission controlling section 232 transmits the configuration data to the processor 206 of the A-D converting apparatus 20 via the communication coupler 21. The processor 206 of the A-D converting apparatus 20 acquires the data transmitted by the data transmission controlling section 232 in step S203 (step S204). The processor 206, upon acquisition of the configuration data in step S204, stores the thus-acquired configuration data in the ROM 205 (step S205).

The evaluation system 2 in accordance with Embodiment 1 thus configured includes the evaluating section 230 that evaluates weld quality based on a time-series analog signal, which is indicative of the manner in which the welding apparatus 90 operates during welding, acquired nondestructively by the physical quantity acquiring section 1. The evaluation system 2 in accordance with Embodiment 1 thus configured also includes: the A-D converting apparatus 20 comprised of a circuit programmable by a user; and the communication module 222 to which a user can input configuration data corresponding to the physical quantity acquiring section 1. This eliminates the need for a user, who constructs a system that evaluates weld quality nondestructively within a period of time short enough to achieve real-time processing, to prepare a measurement apparatus and an evaluation apparatus specially designed for the measurement apparatus. This makes it possible for the user, with less effort, to construct a system that evaluates weld quality nondestructively within a period of time short enough to achieve real-time processing.

The evaluation system 2 in accordance with Embodiment 1 thus constructed includes the A-D converting apparatus 20 that is comprised of a circuit that converts an analog signal to a digital signal. This makes it possible to evaluate weld quality within a period of time short enough to achieve real-time processing.

The evaluation system 2 in accordance with Embodiment 1 thus configured transmits, to the digital signal processing apparatus 22 via the communication coupler 21 and the digital signal transmission line connected to the communication coupler 21, the digital signal obtained by conversion by the A-D converting apparatus 20. A user is enabled to place the A-D converting apparatus 20 near the physical quantity acquiring section 1 by changing the length of the digital signal transmission line. This makes it possible for the user to reduce the length of the analog signal transmission line 3 and thus possible to prevent or reduce the degradation of the analog signal that would occur as the analog signal is transmitted through the analog signal transmission line 3.

Embodiment 2

Figure 13:
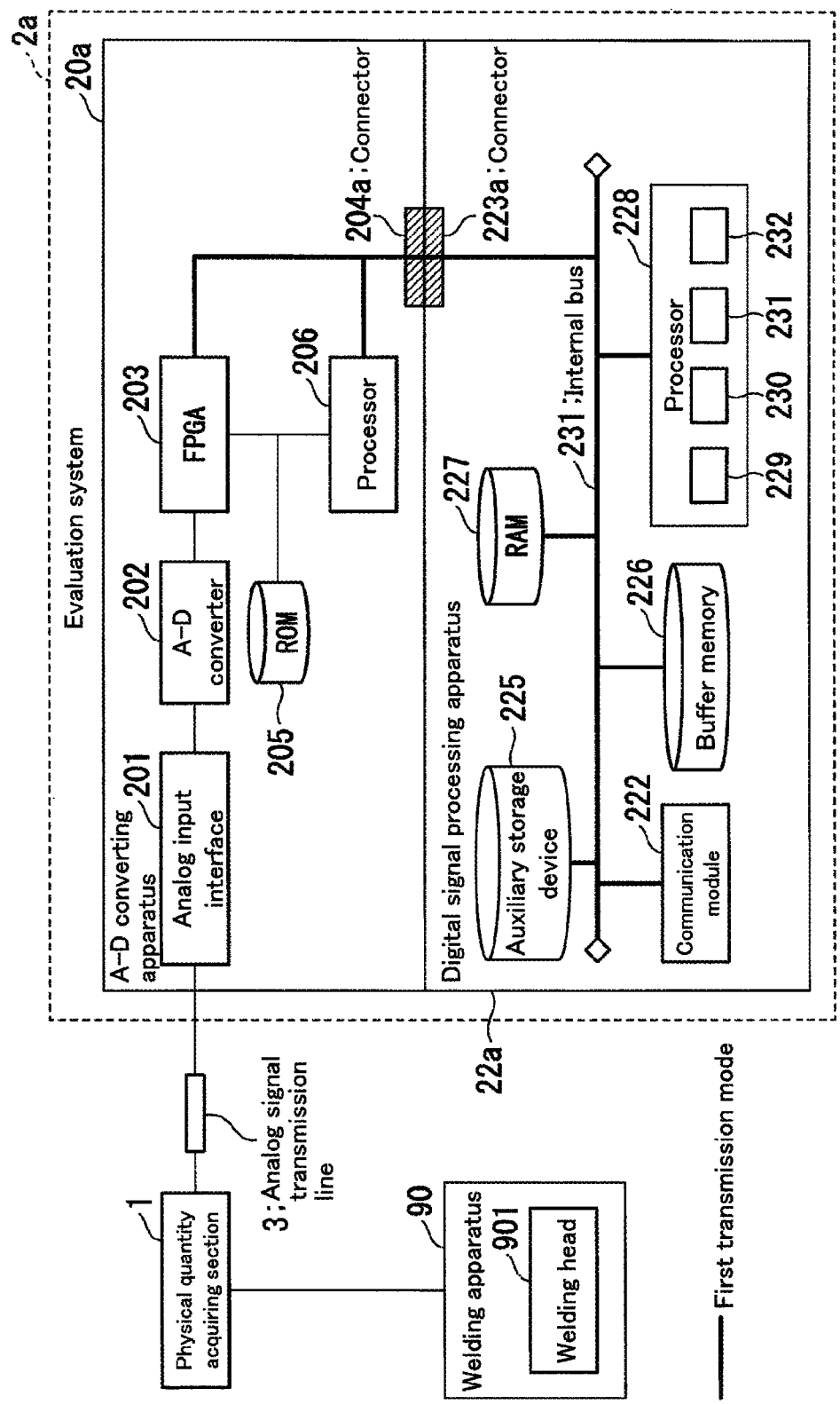
FIG. 13 illustrates a specific example of a configuration of an evaluation system 2a in accordance with Embodiment 2.

FIG. 13 illustrates a specific example of a configuration of an evaluation system 2a in accordance with Embodiment 2. The evaluation system 2a is different from the evaluation system 2 in that the evaluation system 2a includes an A-D converting apparatus 20a and a digital signal processing apparatus 22a instead of the A-D converting apparatus 20, the communication coupler 21, and the digital signal processing apparatus 22. The A-D converting apparatus 20a is different from the A-D converting apparatus 20 in that the A-D converting apparatus 20a includes a connector 204a instead of the connector 204. The digital signal processing apparatus 22a is different from the digital signal processing apparatus 22 in that the digital signal processing apparatus 22a includes a connector 223a instead of the connector 223 and the signal converter module 224.

In the following description, members having the same functions as those of the A-D converting apparatus 20 and the digital signal processing apparatus 22 are assigned the same referential numerals as those shown in FIGS. 1 and 2, and descriptions therefor are omitted.

The connector 204a is a connector for electrical connection between the A-D converting apparatus 20a and the digital signal processing apparatus 22a without a digital signal transmission line interposed between them. Specifically, the connector 204a connects the FPGA 203 and the processor 206 to the internal bus 221, without a digital signal transmission line interposed between them.

The connector 223a, when connected to the connector 204a, electrically connects the digital signal processing apparatus 22a and the A-D converting apparatus 20a without a digital signal transmission line interposed between them.

The evaluation system 2a in accordance with Embodiment 2 thus configured is capable of transmitting an output of the FPGA 203 to the internal bus 221 without having to use a digital signal transmission line, and thus possible to transmit a digital signal in a first transmission mode without having to use a second transmission mode. This makes it possible for the evaluation system 2a to transmit the digital signal from the FPGA 203 to the internal bus 221 more quickly than the evaluation system 2, and thus possible to evaluate weld quality in a shorter period of time and to transmit more data within the same period of time.

(Examples of Applications)

Figure 14:
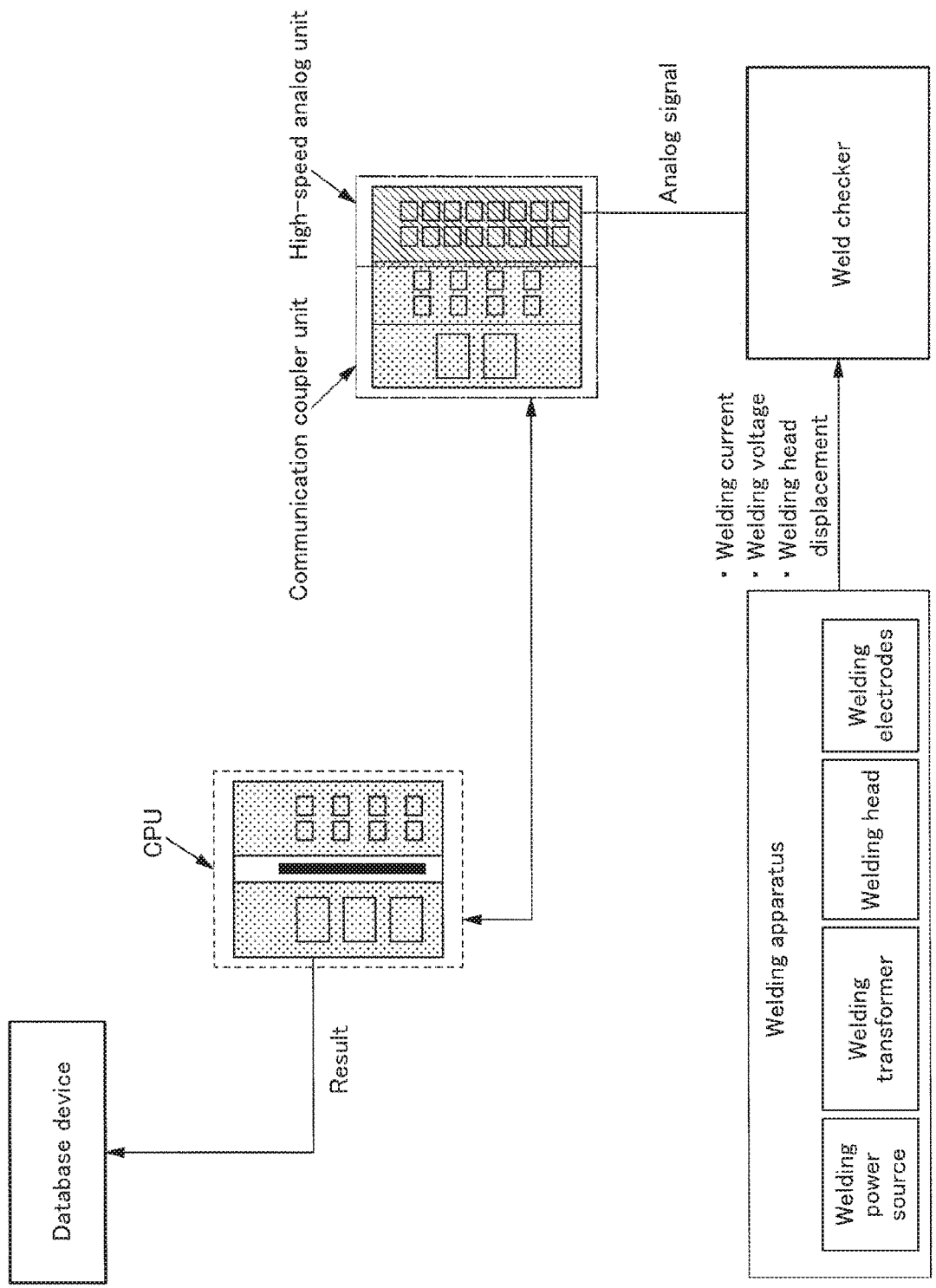
FIG. 14 illustrates an example of application of the evaluation system 2 in accordance with Embodiment 1.

FIG. 14 illustrates an example of application of the evaluation system 2 in accordance with Embodiment 1.

In FIG. 14, a welding apparatus is a specific example of the welding apparatus 90. In FIG. 14, the welding apparatus includes a welding power source, a welding transformer, a welding head, and welding electrodes. The welding electrodes are a specific example of the members that apply welding current, welding voltage or load to pieces to be welded. The welding head is a specific example of the welding head 901. The welding power source supplies electric power to the welding apparatus. The welding transformer converts electric current supplied from the welding power source to electric current having a predetermined value.

A weld checker is a specific example of the physical quantity acquiring section 1. The weld checker measures welding current, welding voltage, welding head displacement, and/or the like.

A CPU is a specific example of the digital signal processing apparatus 22. A communication coupler unit is a specific example of the communication coupler 21. A high-speed analog unit is a specific example of the A-D converting apparatus 20. In FIG. 14, the CPU and the communication coupler unit are connected together by a cable that transmits digital signals.

A database device stores a value indicative of evaluated weld quality by the digital signal processing apparatus.

The system of FIG. 14 thus configured is a system comprised of PLC-based apparatuses. Therefore, the system of FIG. 14 can be constructed with less cost than a system comprised of PC-based apparatuses (e.g., AD board, dedicated personal compounder, and/or the like). Furthermore, the system of FIG. 14 thus configured achieves asset accumulation more easily and can be more easily expanded to other factories/plants and overseas factories/plants than the system comprised of PC-based apparatuses. Furthermore, the apparatuses included in the system of FIG. 14 thus configured are longer in life cycle than the apparatuses included in the system comprised of PC-based apparatuses. This achieves long-term maintenance of the apparatuses.

Figure 15:
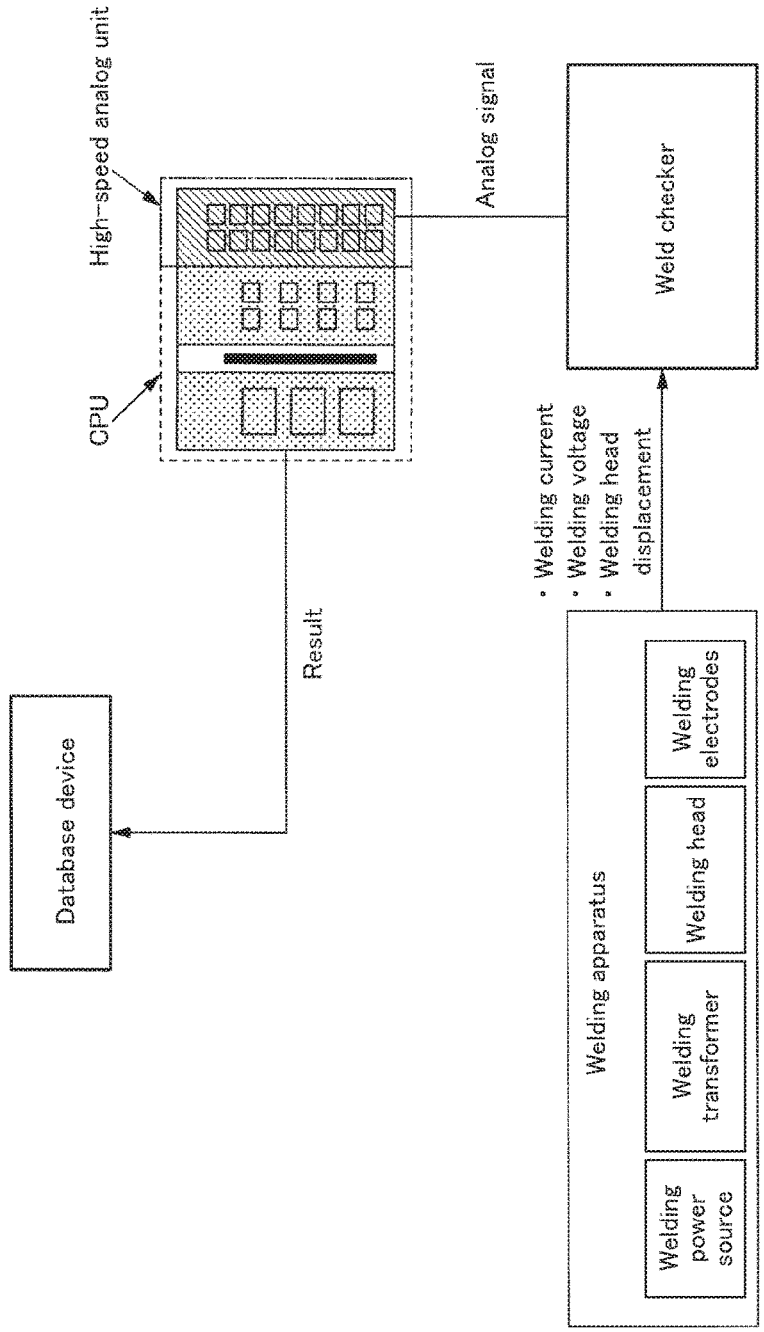
FIG. 15 illustrates an example of application of the evaluation system 2a in accordance with Embodiment 2.

FIG. 15 illustrates an example of application of the evaluation system 2a in accordance with Embodiment 2.

In FIG. 15, a welding apparatus is a specific example of the welding apparatus 90. In FIG. 15, the welding apparatus includes a welding power source, a welding transformer, a welding head, and welding electrodes. The welding electrodes are a specific example of the members that apply welding current, welding voltage or load to pieces to be welded. The welding head is a specific example of the welding head 901. The welding power source supplies electric power to the welding apparatus. The welding transformer converts electric current supplied from the welding power source to electric current having a predetermined value.

A weld checker is a specific example of the physical quantity acquiring section 1. The weld checker measures welding current, welding voltage, welding head displacement, and/or the like.

A CPU is a specific example of the digital signal processing apparatus 22a. A high-speed analog unit is a specific example of the A-D converting apparatus 20a. In FIG. 15, the CPU and the high-speed analog unit are connected together without a cable that transmits digital signals interposed between them.

A database device stores a value indicative of evaluated weld quality by the digital signal processing apparatus.

The system of FIG. 15 thus configured is a system comprised of PLC-based apparatuses. Therefore, the system of FIG. 15 can be constructed with less cost than a system comprised of PC-based apparatuses (e.g., AD board, dedicated personal compounder, and/or the like). Furthermore, the system of FIG. 15 thus configured achieves asset accumulation more easily and can be more easily expanded to other factories/plants and overseas factories/plants than the system comprised of PC-based apparatuses. Furthermore, the apparatuses included in the system of FIG. 15 thus configured are longer in life cycle than the apparatuses included in the system comprised of PC-based apparatuses. This achieves long-term maintenance of the apparatuses.

Note that, with regard to the evaluation system 2 and the evaluation system 2a, the number of analog input interfaces 201 and the number of A-D converters 202 included in each system are each not limited to one. The evaluation system 2 and the evaluation system 2a may each include N (N is an integer of 2 or more) analog input interfaces 201 and N A-D converters 202. In such a case, the evaluation system 2 and the evaluation system 2a may be arranged such that digital signals are generated under different conditions corresponding to respective analog signals inputted to the respective analog input interfaces 201. Specific examples of the different conditions include different sampling periods, different digital filter settings (enabled/disabled states of moving average filter, lowpass filter), and the like.

The following description specifically discusses a case where the evaluation system 2 and the evaluation system 2a each include two analog input interfaces 201. In the following description, a first analog input interface 201 is referred to as Ch1, and a second analog input interface 201 is referred to as Ch2. In this case, the evaluation system 2 and the evaluation system 2a may be arranged such that an analog signal inputted to the Ch1 is sampled at a sampling frequency of 10 microseconds per sampling whereas an analog signal inputted to the Ch2 is sampled at a sampling frequency of 100 microseconds per sampling.

Note that all or portion of the functions of the A-D converting apparatus 20, the A-D converting apparatus 20a, the communication coupler 21, the digital signal processing apparatus 22, and the digital signal processing apparatus 22a may be realized by hardware such as an application specific integrated circuit (ASIC), programmable logic device (PLD), FPGA, and/or the like. The digital signal processing operation program may be stored in a computer-readable storage medium. Examples of the computer-readable storage medium include: portable media such as flexible disks, magneto-optical disks, ROMs, and CD-ROMs; and storage devices such as a hard disk included in a computer system. The program may be transmitted through electric communication lines.

The descriptions so far discussed Embodiments of the present invention in detail with reference to the drawings. Note, however, that a specific configuration is not limited to such Embodiments. The scope of the present invention also encompasses other designs and the like, provided that such designs and the like do not go beyond the gist of the present invention.

REFERENCE SIGNS LIST 1 physical quantity acquiring section
2 evaluation system
3 analog signal transmission line
90 welding apparatus
20 analog-to-digital (A-D) converting apparatus
21 communication coupler
22 digital signal processing apparatus
201 analog input interface
202 A-D converter
203 field programmable gate array (FPGA)
204 connector
205 read only memory (ROM)
206 processor
211 connector
212 connector
213 signal converter module
221 connector
222 connector
221 internal bus
222 communication module
223 connector
224 signal converter module
225 auxiliary storage device
226 buffer memory
227 random access memory (RAM)
228 processor
229 first storing section
230 evaluating section
231 second storing section
232 data transmission controlling section
2a evaluation system
20a A-D converter
23a digital signal processing apparatus
204a connector
223a connector

The invention claimed is:
1. An evaluation system comprising:
an analog-to-digital converting section including:
an AD converter configured to convert an analog signal to a digital signal, the analog signal being acquired by a physical quantity acquiring section and indicative of a time-series change of at least one of (i) welding current, welding voltage, or load applied to pieces to be welded during welding and (ii) a displacement, during welding, of a welding head of a welding apparatus that is configured to apply the welding current, welding voltage, or load to the pieces to be welded;

a Field Programmable Gate Array (FPGA) that is a programmable circuit for carrying out arithmetic processing on the digital signal outputted by the A-D converter, a memory for storing configuration data for the FPGA; and a processor configured to read the configuration data stored in the memory, cause the FPGA to acquire the configuration data, and cause the FPGA to be configured as a circuit for carrying out the arithmetic processing based on the configuration data; and a digital signal processing apparatus including:

an evaluating section configured to acquire the digital signal having been subjected to the arithmetic processing and determine, based on the digital signal having been subjected to the arithmetic processing, whether or not at least one of (i) the welding current, welding voltage or load applied during welding and (ii) the displacement satisfies a predetermined condition;

a communication module configured to communicate with an external apparatus;

an auxiliary storage device for storing information;

a storing section configured to store, in the auxiliary storage device, the configuration data inputted by a user to the communication module via the external apparatus; and a data transmission controlling section configured to transmit, to the analog-to-digital converting section, the configuration data stored in the auxiliary storage device, wherein the processor of the analog-to-digital converting section is configured to store, in the memory, the configuration data transmitted from the digital signal processing apparatus, and the arithmetic processing, based on the configuration data stored in the memory, to be carried out by the FPGA changeable by the user.

* * * * *